(12) United States Patent
Suzuki (10) Patent No.: US 11,726,705 B2
(45) Date of Patent: Aug. 15, 2023

(54) SEMICONDUCTOR DEVICE

(71) Applicant: Kioxia Corporation, Tokyo (JP)

(72) Inventor: Tomoaki Suzuki, Chigasaki (JP)

(73) Assignee: Kioxia Corporation, Tokyo (JP)

( * ) Notice: Subject to any disclaimer, the term of this patent is extended or adjusted under 35 U.S.C. 154(b) by 142 days.

(21) Appl. No.: 17/121,204

(22) Filed: Dec. 14, 2020

(65) Prior Publication Data

US 2021/0294521 A1   Sep. 23, 2021

(30) Foreign Application Priority Data

Mar. 23, 2020   (JP) .............................. JP2020-050570

(51) Int. Cl.
*G06F 3/06* (2006.01)
(52) U.S. Cl.
CPC .......... *G06F 3/0656* (2013.01); *G06F 3/0604* (2013.01); *G06F 3/0679* (2013.01)
(58) Field of Classification Search
CPC ..... G06F 3/0656; G06F 3/0604; G06F 3/0679
See application file for complete search history.

(56) References Cited

U.S. PATENT DOCUMENTS

| | | | |
|---|---|---|---|
| 8,159,889 B2 | 4/2012 | Ryu | |
| 10,347,338 B2 | 7/2019 | Shimura et al. | |
| 2006/0152981 A1 | 7/2006 | Ryu | |
| 2012/0173806 A1 | 7/2012 | Ryu | |
| 2015/0067450 A1 | 3/2015 | Ryu | |
| 2015/0143062 A1 | 5/2015 | Tsuboi et al. | |
| 2016/0132389 A1 | 5/2016 | Ryu | |
| 2017/0357581 A1* | 12/2017 | Yanagidaira | ........ G06F 12/0653 |
| 2019/0095134 A1* | 3/2019 | Li | .......................... G06F 3/0656 |
| 2019/0279716 A1 | 9/2019 | Shimura et al. | |
| 2019/0303019 A1 | 10/2019 | Sunata et al. | |
| 2019/0362761 A1* | 11/2019 | Sato | ........................ G11C 16/24 |
| 2019/0378578 A1* | 12/2019 | Torigoe | ............... G06F 13/1689 |

FOREIGN PATENT DOCUMENTS

| | | | |
|---|---|---|---|
| JP | 2000-187637 A | 7/2000 | |
| JP | 2006-195990 A | 7/2006 | |
| JP | 2015-99570 A | 5/2015 | |
| JP | 2018-156708 A | 10/2018 | |
| JP | 2019-179455 A | 10/2019 | |
| JP | 2019-204565 A | 11/2019 | |
| WO | WO 2016/143009 A1 | 9/2016 | |

* cited by examiner

*Primary Examiner* — Edward J Dudek, Jr.
(74) *Attorney, Agent, or Firm* — Oblon, McClelland, Maier & Neustadt, L.L.P.

(57) ABSTRACT

According to one embodiment, in a semiconductor device, a first chip is electrically connected to a terminal to which a signal from a host is input. The first chip is electrically connected to a second chip and to a third chip in parallel with the second chip. The first chip includes a first buffer memory and a second buffer memory. The first buffer memory corresponds to the second chip. The second buffer memory corresponds to the third chip. The second chip includes a third buffer memory. The third chip includes a fourth buffer memory. A capacity of the first buffer memory is equal to or larger than a capacity of the third buffer memory. A capacity of the second buffer memory is equal to or larger than a capacity of the fourth buffer memory.

19 Claims, 8 Drawing Sheets

SEMICONDUCTOR DEVICE

CROSS-REFERENCE TO RELATED APPLICATIONS

This application is based upon and claims the benefit of priority from Japanese Patent Application No. 2020-050570, filed on Mar. 23, 2020; the entire contents of which are incorporated herein by reference.

FIELD

Embodiments described herein relate generally to a semiconductor device.

BACKGROUND

There is a semiconductor device in which a bridge chip is arranged between an external terminal connected to a host and a plurality of chips. In this semiconductor device, access to the plurality of chips from the host is performed via the bridge chip. At this time, it is desired to access the plurality of chips at high speed.

DETAILED DESCRIPTION

In general, according to one embodiment, there is provided a semiconductor device including a first chip, a second chip, a third chip. The first chip is electrically connected to a terminal to which a signal from a host is input. The first chip is electrically connected to a second chip and to the third chip in parallel with the second chip. The first chip includes a first buffer memory and a second buffer memory. The first buffer memory corresponds to the second chip. The second buffer memory corresponds to the third chip. The second chip includes a third buffer memory. The third chip includes a fourth buffer memory. A capacity of the first buffer memory is equal to or larger than a capacity of the third buffer memory. A capacity of the second buffer memory is equal to or larger than a capacity of the fourth buffer memory.

Exemplary embodiments of a semiconductor device will be explained below in detail with reference to the accompanying drawings. The present invention is not limited to the following embodiments.

Embodiment

The semiconductor device according to the embodiment includes an external terminal to which a host can be connected, a bridge chip, and a plurality of chips. The plurality of chips are connected to the external terminal via the bridge chip. The host is connected to the external terminal of the semiconductor device via a wired communication path. In this semiconductor device, access to the plurality of chips via the wired communication path from the host is performed via the bridge chip. Each chip is, for example, a memory chip of a non-volatile memory such as a NAND flash memory.

When each chip is the memory chip, the number of chips to be provided increases in the semiconductor device in order to expand the storage capacity. At this time, memory system vendors might adopt a bridge chip called a frequency boosting interface (FBI) chip. Putting FBI chip between the external terminal and the plurality of chips reduces the load applied to connection with each of the chips. It enables to achieve high speed connection with low electrical noise. The plurality of chips can be connected to the respective channels. A bandwidth of the wired communication path is equal to a bandwidth of each of the channels and smaller than the total bandwidth of the respective channels of the FBI. Since one channel out of the plurality of channels is selectively used, the communication speed between the bridge chip and external terminal may not exceed the communication speed of the channel for each memory channel.

Therefore, in the present embodiment, in the semiconductor device, a plurality of buffer memories corresponding to the plurality of channels are provided in the bridge chip with a capacity equal to or larger than a capacity of a buffer memory for input/output of each of the chips to improve the data transfer speed between the host and the plurality of chips via the bridge chip.

Figure 1:
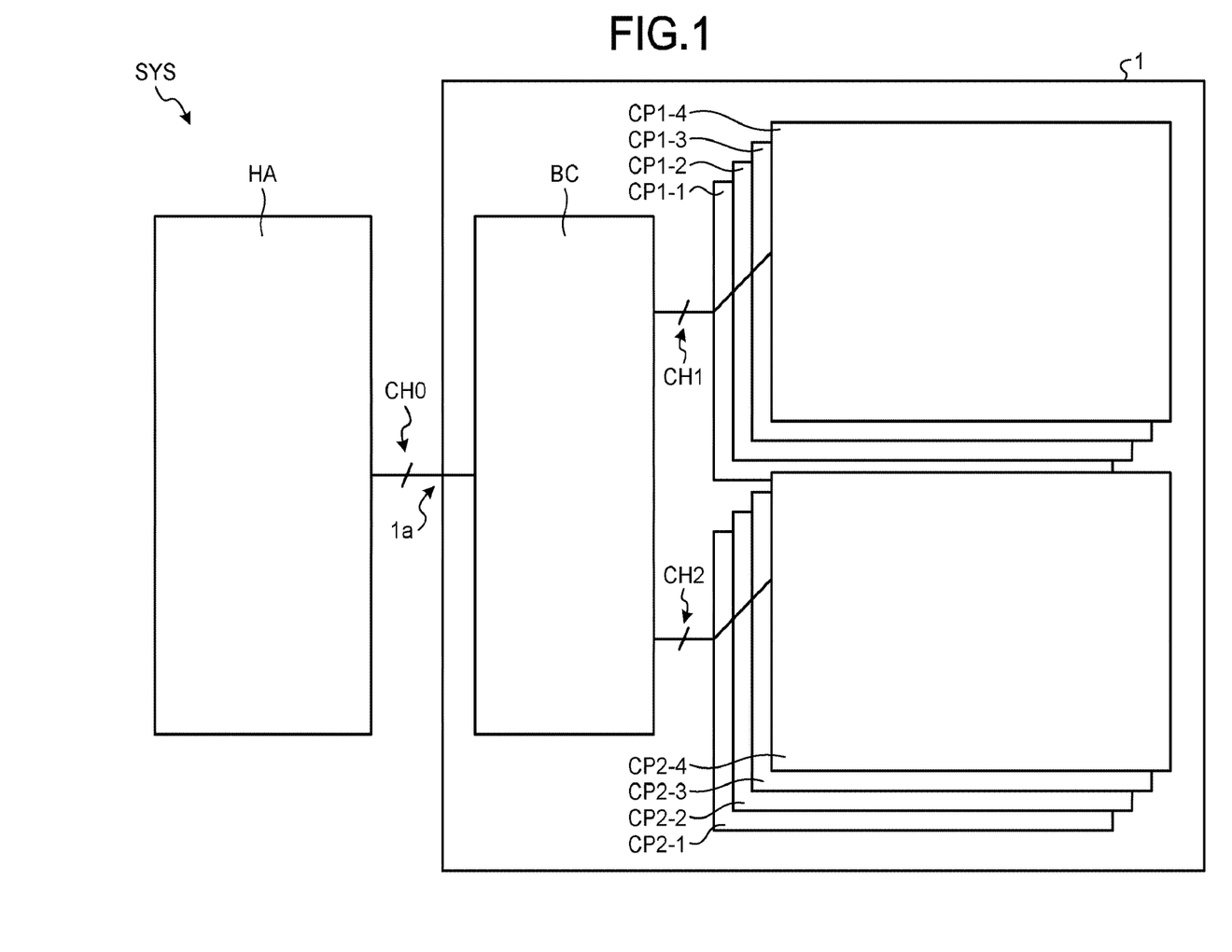
FIG. 1 is a diagram illustrating a configuration of a storage system to which a semiconductor device according to an embodiment is applied.

Specifically, a storage system SYS to which a semiconductor device 1 is applied is configured as illustrated in FIG. 1. FIG. 1 is a diagram illustrating a configuration of the storage system SYS to which the semiconductor device 1 is applied.

The storage system SYS includes a host HA and the semiconductor device 1. The semiconductor device 1 includes a bridge chip BC and a plurality of chips CP1-1 to CP1-4 and CP2-1 to CP2-4. The semiconductor device 1 can be configured as a multi-chip package (MCP) in which the chips CP1-1 to CP1-4 are stacked and the chips CP2-1 to CP2-4 are also stacked. When the semiconductor device 1 is configured as the MCP, the periphery of the bridge chip BC and the plurality of chips CP1-1 to CP1-4 and CP2-1 to CP2-4 may be sealed with a mold resin in the semiconductor device 1. FIG. 1 illustrates a configuration in which the four chips CP1-1 to CP1-4 are connected to the bridge chip BC via a channel CH1 and the four chips CP2-1 to CP2-4 are connected to the bridge chip BC via a channel CH2. That is, the semiconductor device 1 can be configured as a multi-chip module including the plurality of (here, eight) chips CP1-1 to CP1-4 and CP2-1 to CP2-4. Each of the chips CP1-1 to CP1-4 and CP2-1 to CP2-4 is a memory chip of a non-volatile memory such as a NAND flash memory.

The host HA may be a device such as a controller or may be a processor that is provided in an electronic device such as a computer and a mobile terminal and controls the semiconductor device 1. The semiconductor device 1 can be connected to the host HA via a wired communication path (for example, a serial bus) CH0. The semiconductor device 1 and the host HA are connected via the wired communication path CH0 configured based on a predetermined standard. When each of the chips 1-1 to CP1-4 and CP2-1 to CP2-4 is a NAND flash memory, the predetermined standard may be, for example, a toggle DDR standard or an ONFi standard. For example, the wired communication path CH0 functions as a toggle DDR interface.

The bridge chip BC is electrically connected between an external terminal group 1a and the plurality of (here, two) channels CH1 and CH2. The external terminal group 1a can be electrically connected to the host HA via the wired communication path CH0. The plurality of chips CP1-1 to CP1-4 and CP2-1 to CP2-4 are connected to the bridge chip BC via the plurality of channels CH1 and CH2. The bridge chip BC and each of the chips 1-1 to CP1-4 and CP2-1 to CP2-4 are connected via the channels CH1 and CH2 configured based on a predetermined standard. When each of the chips 1-1 to CP1-4 and CP2-1 to CP2-4 is a NAND flash memory, the predetermined standard may be, for example, the toggle DDR standard or the ONFi standard. For example, the wired communication paths CH1 and CH2 function as toggle DDR interfaces.

Figure 2:
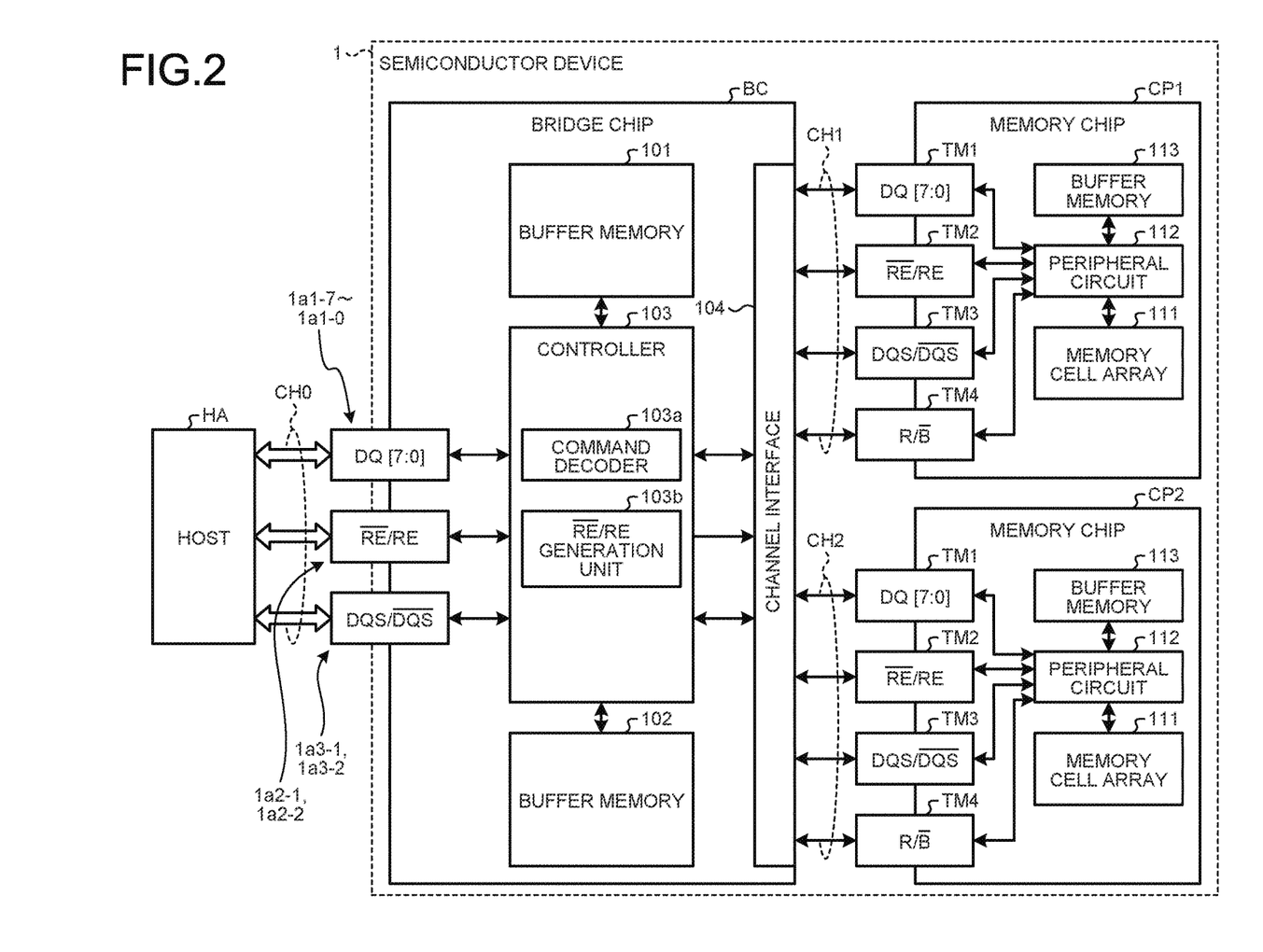
FIG. 2 is a diagram illustrating a configuration of the semiconductor device according to the embodiment.

For example, as illustrated in FIG. 2, the external terminal group 1a includes terminals 1a1-7 to 1a1-0 for a data signal DQ[7:0], terminals 1a2-1 and 1a2-2 for a read enable signal $RE^-$/RE, terminals 1a3-1 and 1a3-2 for a data strobe signal $DQS/DQS^-$, and a terminal 1a4 for an $R/B^-$ signal. FIG. 2 is a diagram illustrating a configuration of the semiconductor device 1. In FIG. 2, the respective chips 1-1 to CP1-4 or CP2-1 to CP2-4 connected via the channel CH1 or CH2 are illustrated as the single chip CP1 or CP2 in order to simplify the illustration.

Along with an increase in required access speed, an operation related to a command can be performed in synchronization with a double edge of a timing signal for strobing transfer data in the semiconductor device 1. An example of the transfer data is the data signal DQ[7:0], and an example of the timing signal is the data strobe signal $DQS/DQS^-$. Therefore, the timing signal can be configured using a differential signal. The read enable signal $RE^-$ and the read enable signal RE form a pair of differential signals. The data strobe signal DQS and the data strobe signal $DQS^-$ form a pair of differential signals.

The bridge chip BC has a buffer memory 101, a buffer memory 102, a controller 103, and a channel interface 104.

The controller 103 is arranged between the terminals 1a1-7 to 1a1-0, 1a2-1, 1a2-2, 1a3-1, 1a3-2, and 1a4 and the channel interface 104. The controller 103 uses the buffer memories 101 and 102 to control transmission and reception of information between the terminals 1a1-7 to 1a1-0, 1a2-1, 1a2-2, 1a3-1, 1a3-2, and 1a4 and the channel interface 104.

The controller 103 has a command decoder 103a and an $RE^-$/RE generation unit 103b. The command decoder 103a analyzes a command received from the host HA via the terminals 1a1-7 to 1a1-0 and issues a command to the chips CP1 and CP2 according to the analysis result. The issued command is supplied from the channel interface 104 to either the chip CP1 or CP2 via the channel CH1 or CH2. For example, the command decoder 103a may receive a read data command or a data output command from the host HA. The read data command is a command that instructs data transfer from each of the memory cell arrays 111 of the chips CP1 and CP2 to the respective buffer memory 113. The data output command is a command that instructs the chips CP1 and CP2 to output data stored in the buffer memories 113 of the chips CP1 and CP2. In responds to receipt of each of the commands, the command decoder 103a supplies a corresponding command from the channel interface 104 to either the chip CP1 or CP2 via the channel CH1 or CH2.

The $RE^-$/RE generation unit 103b autonomously generates the read enable signal $RE^-$/RE when the command is the data output command in response to the analysis result of the command decoder 103a. The generated read enable signal $RE^-$/RE is supplied from the channel interface 104 to either the chip CP1 or CP2 via the channel CH1 or CH2.

When receiving the read enable signal $RE^-$/RE from the host HA via the terminal groups 1a2-1 and 1a2-2, the controller 103 generates the data strobe signal $DQS/DQS^-$ from the read enable signal $RE^-$/RE, and outputs the generated data strobe signal $DQS/DQS^-$ via the terminal groups 1a3-1 and 1a3-2. The read enable signal $RE^-$/RE is the timing signal supplied from the host HA. The data strobe signal $DQS/DQS^-$ is a timing signal output to the host HA in response to a request of reading data from the host HA.

The buffer memory 101 is provided correspond to the chip CP1 connected via the channel CH1. A capacity of the buffer memory 101 is equal to or larger than a capacity of the buffer memory 113 provided in the chip CP1. Even when information stored in the buffer memory 113 is collectively transferred to the bridge chip BC, the controller 103 can store the information into the buffer memory 101. The buffer memory 101 can be configured using, for example, an SRAM.

The buffer memory 102 is provided correspond to the chip CP2 connected via the channel CH2. A capacity of the buffer memory 102 is equal to or larger than a capacity of the buffer memory 113 provided in the chip CP2. Even when the information stored in the buffer memory 113 is collectively transferred to the bridge chip BC, the controller 103 can store the information into the buffer memory 102. The buffer memory 102 can be configured using, for example, an SRAM.

The channel interface 104 performs connection with the chips CP1 and CP2 via the channels CH1 and CH2. The channel interface 104 transfers a command, an address, data, or the like supplied from the controller 103 to the chips CP1 and CP2 via the channels CH1 and CH2, and stores data and the like supplied from the chips CP1 and CP2 into the buffer memories 101 and 102 and supplies the data and the like to the controller 103.

Each of the chips CP1 has terminal groups TM1 to TM4, the memory cell array 111, a peripheral circuit 112, and the buffer memory 113. The terminal groups TM1 to TM4 are electrically connected to the channel interface 104 via one channel CH1. The terminal groups TM1, TM2, TM3, and MT4 of each of the plurality of chips CP1-1 to CP1-4 are electrically connected to each other. The terminal groups TM1 to TM3 and the terminal MT4 are electrically connected to one ends of the peripheral circuit 112 and the channel CH1. The other end of the channel CH1 is electrically connected to the channel interface 104. Hereinafter, in order to simplify the description, each of the chips CP1-1 to CP1-4 is illustrated as the chip CP1, and a configuration in which the chip CP1 is connected to the channel CH1 is sometimes described.

The terminal group TM1 is a terminal group for the data signal DQ[7:0]. The terminal group TM1 includes the number of terminals corresponding to a bit width (for example, 8-bit width) of the data signal DQ[7:0].

The terminal group TM2 is a terminal group for the read enable signal RE⁻/RE. The terminal group TM2 includes the number of terminals corresponding to a bit width (for example, 2 bits) of the read enable signal RE⁻/RE.

The terminal group TM3 is a terminal group for the data strobe signal DQS/DQS⁻. The terminal group TM3 includes the number of terminals corresponding to a bit width (for example, 2 bits) of the data strobe signal DQS/DQS⁻.

The terminal TM4 is a terminal for a ready busy signal R/B⁻. The terminal TM4 is a terminal corresponding to a bit width (for example, 1 bit) of the ready busy signal R/B⁻.

In the memory cell array 111, a plurality of memory cells are arrayed two-dimensionally or three-dimensionally. The memory cell array 111 is connected to the peripheral circuit 112. The peripheral circuit 112 is arranged in the periphery of the memory cell array 111, and is electrically connected between the terminal groups TM1 to TM3 and the terminal TM4, and the buffer memory 113 and the memory cell array 111. The peripheral circuit 112 uses the buffer memory 113 to control access operations (for example, a read operation or a write operation) to each memory cell of the memory cell array 111 in response to a command received from the bridge chip BC via the terminal group TM1.

The buffer memory 113 is a buffer for input/output via the terminal group TM1 in each of the chips CP1-1 to CP1-4, and is also called an input/output data latch or a page buffer. The peripheral circuit 112 reads data from the memory cell array 111 and temporarily stores the read data into the buffer memory 113 in response to the read data command received from the bridge chip BC. Therefore, the capacity of the buffer memory 113 has a data size (for example, 16 [kB]) which is a unit of reading data in the chip CP1.

The peripheral circuit 112 supplies the data stored in the buffer memory 113 to the bridge chip BC via the terminal group TM1 and the channel CH1 in response to the data output command received from the bridge chip BC. At this time, the controller 103 of the bridge chip BC temporarily stores the data received from the chip CP1 into the buffer memory 101.

Here, the capacity of the buffer memory 101 of the bridge chip BC is an integral multiple of the data size which is the unit of reading the data in the chip CP1 (for example, 16×N [kB], N is an arbitrary positive integer). As a result, the buffer memory 101 can continuously store the read data when the read data is continuously output from the chip CP1.

Each of the chips CP2 connected to the channel CH2 has the terminal groups TM1 to TM3, the terminal TM4, the memory cell array 111, and the peripheral circuit 112. Since each configuration is the same as that of each of the chips CP1 connected to the channel CH1, the description thereof will be omitted.

Figure 3A:
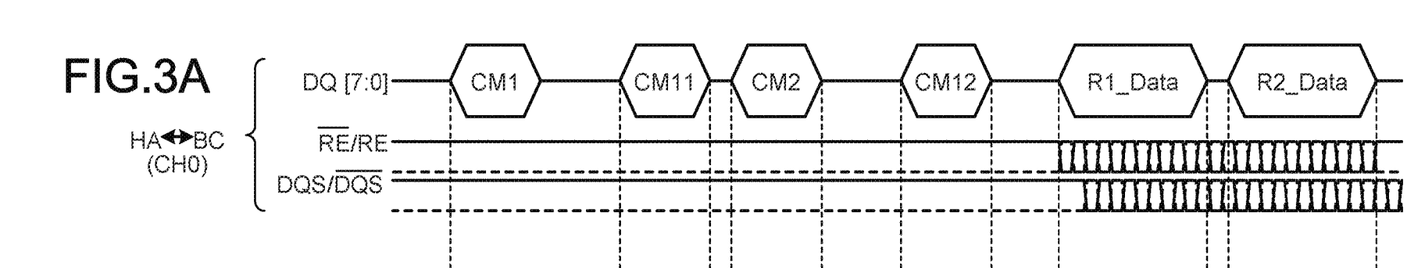
FIGS. 3A to 3C are waveform diagrams illustrating operations of the semiconductor device according to the embodiment.
Figure 3B:
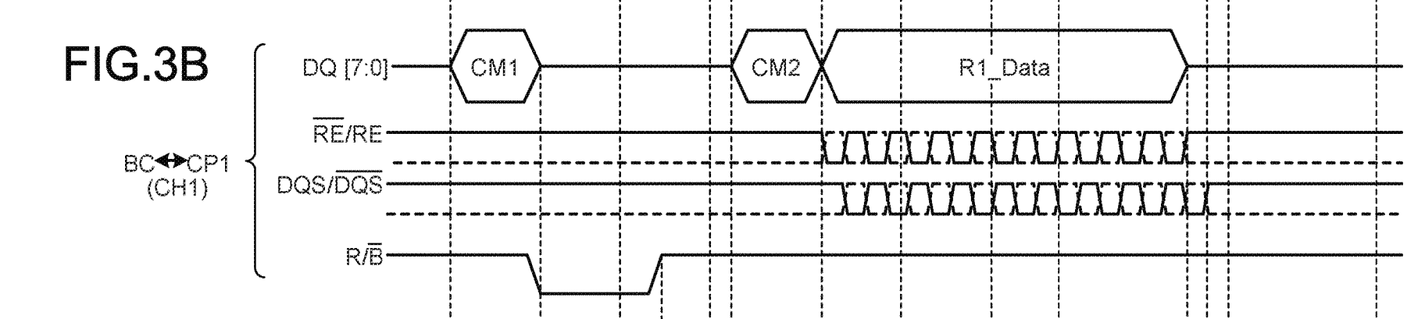
Figure 3C:
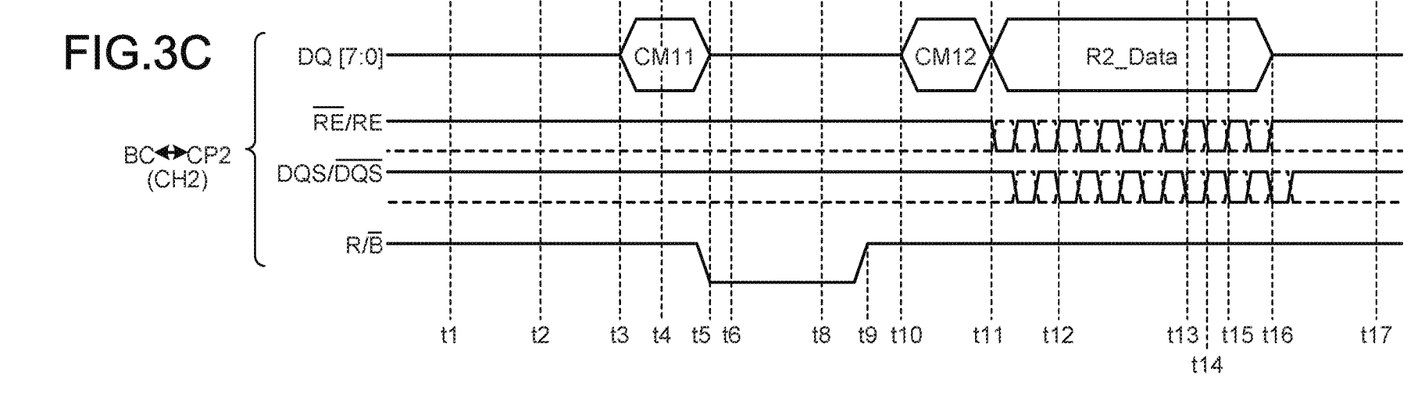
Figure 4A:
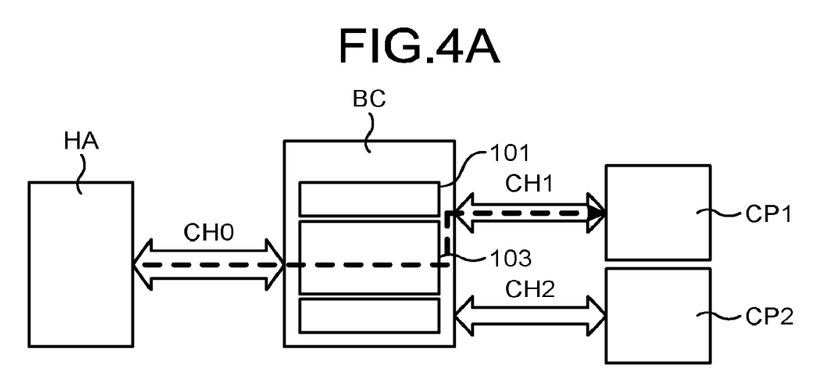
FIGS. 4A and 4B are views illustrating operations of the semiconductor device according to the embodiment.
Figure 4B:
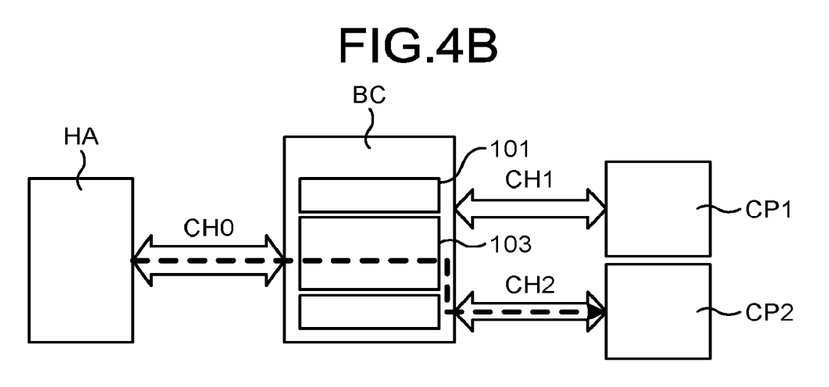
Figure 5A:
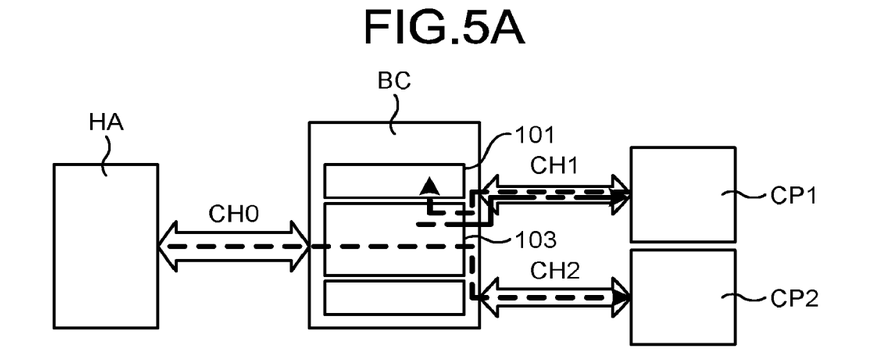
FIGS. 5A to 5C are views illustrating operations of the semiconductor device according to the embodiment.
Figure 5B:
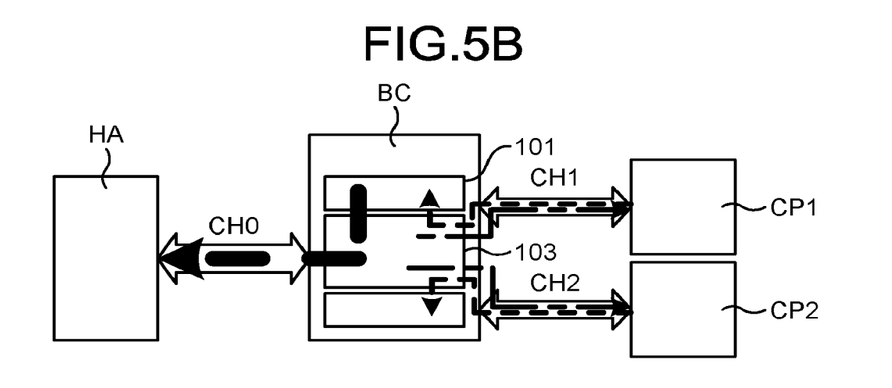
Figure 5C:
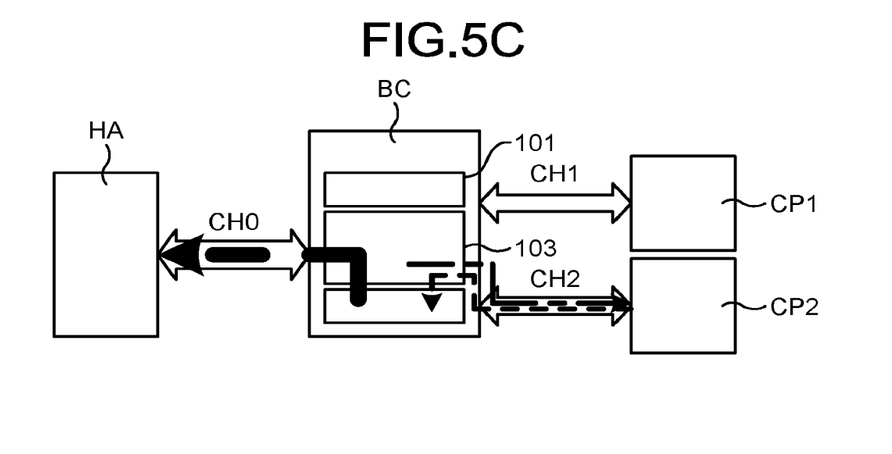

Next, operations of the semiconductor device 1 will be described with reference to FIGS. 3A to 5C. FIGS. 3A to 3C are waveform diagrams illustrating the operations of the semiconductor device 1. FIG. 3A illustrates a level of a signal transmitted and received between the host HA and the bridge chip BC via the wired communication path CH0. FIG. 3B illustrates a level of a signal transmitted and received between the bridge chip BC and each of the chips CP1 via the channel CH1. FIG. 3C illustrates a level of a signal transmitted and received between the bridge chip BC and each of the chips CP2 via the channel CH2. FIGS. 4A and 4B are views illustrating operations of the semiconductor device 1. FIGS. 5A to 5C are views illustrating other operations of the semiconductor device 1.

At timing t1 illustrated in FIGS. 3A to 3C, the controller 103 of the bridge chip BC receives a read data command CM1 for the chip CP1 from the host HA via a terminal 1a1 for DQ and recognizes that this command is a command for the chip CP1. The controller 103 can recognize that the command is the read data command by viewing the last byte of the read data command CM1. In response, the controller 103 transfers the read data command CM1 to the terminal group TM1 for DQ of the chip CP1 via the channel CH1 as indicated by the dotted line in FIG. 4A. In the chip CP1, the peripheral circuit 112 receives the read data command CM1 via the terminal group TM1.

At timing t2 illustrated in FIGS. 3A to 3C, in response to receipt of the read data command, the peripheral circuit 112 of the chip CP1 causes the ready busy signal R/B⁻ to transition from an H level (ready) to an L level (busy) to supply the ready busy signal R/B⁻ to the bridge chip BC via the terminal TM4 and the channel CH1. At the same time, the peripheral circuit 112 of the chip CP1 reads data corresponding to the read data command from the memory cell array 111 and temporarily stores the data in the buffer memory 113.

At timing t3, the controller 103 of the bridge chip BC receives a read data command CM11 for the chip CP2 from the host HA via the terminal 1a1 for DQ and recognizes that this command is a command for the chip CP2. In response, the controller 103 transfers the read data command CM11 to the terminal group TM1 for DQ of the chip CP2 via the channel CH2 as indicated by the dotted line in FIG. 4B. In the chip CP2, the peripheral circuit 112 receives the read data command CM11 via the terminal group TM1.

At timing t4, in response to the completion of storage of the read data in the buffer memory 113, the peripheral circuit 112 of the chip CP1 causes the ready busy signal R/B⁻ to transition from the L level (busy) to the H level (ready) to supply the ready busy signal R/B⁻ to the bridge chip BC via the terminal TM4 and the channel CH1.

At timing t5 illustrated in FIGS. 3A to 3C, in response to the receipt of the read data command, the peripheral circuit 112 of the chip CP2 causes the ready busy signal R/B⁻ to transition from an H level (ready) to an L level (busy) to supply the ready busy signal R/B⁻ to the bridge chip BC via the terminal TM4 and the channel CH2. At the same time, the peripheral circuit 112 of the chip CP2 reads data corresponding to the read data command from the memory cell array 111 and temporarily stores the data in the buffer memory 113.

At timing t6, the controller 103 of the bridge chip BC receives a data output command CM2 for the chip CP1 from the host HA via the terminal 1a1 for DQ, and recognizes that the command is a command for the chip CP1 and is the data output command. The controller 103 can recognize that the command is the data output command by viewing the last byte of the data output command CM2. In response, the controller 103 controls the channel CH1 independently of the host HA.

During a period after timing t5 in which the chip CP2 is busy, the controller 103 can access the chip CP1 in response to receipt of the command for the chip CP1. That is, at timing t6, the controller 103 transfers the data output command CM2 to the terminal group TM1 for DQ of the chip CP1 via the channel CH1. In the chip CP1, the peripheral circuit 112 receives the data output command CM2 via the terminal group TM1. Further, the controller 103 generates the read enable signal RE⁻/RE and transfers the read enable signal RE⁻/RE to the chip CP1 via the terminal group TM2.

In the chip CP1, the peripheral circuit 112 receives the read enable signal RE⁻/RE via the terminal group TM2.

During a period between timings t8 and t13 illustrated in FIGS. 3A to 3C, the peripheral circuit 112 of the chip CP1 supplies data stored in the buffer memory 113 from the terminal group TM1 to the bridge chip BC as a data signal DQ via the channel CH1 in response to receipt of the data output command CM2. The peripheral circuit 112 generates the data strobe signal DQS/DQS⁻ from the input read enable signal RE⁻/RE and supplies the data strobe signal DQS/DQS⁻ to the bridge chip BC via the terminal group TM3 and the channel CH1. At this time, the data signal DQ and the data strobe signal DQS are synchronized.

In response, the controller 103 of the bridge chip BC temporarily stores the data received from the chip CP1 in the buffer memory 101 as indicated by the dotted line in FIG. 5A.

At least during a period in the first half of the period between timings t8 and t13 illustrated in FIGS. 3A to 3C, the wired communication path CH0 between the host HA and the bridge chip BC is not used in the operation of accessing the chip CP1 via the channel CH1. Therefore, the host HA and the controller 103 can use the wired communication path CH0 for the operation of accessing the chip CP2 via the other channel CH2.

At timing t8, the controller 103 keeps the R/B signal of the wired communication path CH0 at the H level, and autonomously generates the read enable signal RE⁻/RE and transfers the read enable signal RE⁻/RE to the terminal group TM2 for RE⁻/RE of the chip CP1 via the channel CH1 as indicated by the alternate long and short dash line in FIG. 5A. The peripheral circuit 112 that has received the read enable signal RE sets the R/B⁻ signal to the L level.

At timing t9, in response to the completion of storage of the read data in the buffer memory 113, the peripheral circuit 112 of the chip CP2 causes the ready busy signal R/B⁻ to transition from the L level (busy) to the H level (ready) to supply the ready busy signal R/B⁻ to the bridge chip BC via the terminal TM4 and the channel CH1.

At timing t10, the controller 103 of the bridge chip BC receives a data output command CM12 for the chip CP2 from the host HA via the terminal 1a1 for DQ, and recognizes that the command is a command for the chip CP2 and is the data output command. The controller 103 can recognize that the command is the data output command by viewing the last byte of the data output command CM12. In response, the controller 103 controls the channel CH2 independently of the host HA.

During a period after timing t8 in which the chip CP1 is busy, the controller 103 can access the chip CP2 in response to receipt of the command for the chip CP2. That is, at timing t10, the controller 103 transfers the data output command CM12 to the terminal group TM1 for DQ of the chip CP2 via the channel CH2 as indicated by the dotted line in FIG. 5A. In the chip CP2, the peripheral circuit 112 receives the data output command CM12 via the terminal group TM1 and the buffer memory 113.

At timing t11 illustrated in FIGS. 3A to 3C, the controller 103 keeps the R/B⁻ signal of the wired communication path CH0 at the H level, and autonomously generates the read enable signal RE⁻/RE as indicated by the alternate long and short dash line in FIG. 5B. The controller 103 transfers the generated read enable signal RE⁻/RE to the terminal group TM2 for RE⁻/RE of the chip CP2 via the channel CH2. The peripheral circuit 112 that has received the read enable signal RE sets the R/B⁻ signal to the L level.

During a period between timings t11 and t16 illustrated in FIGS. 3A to 3C, the peripheral circuit 112 of the chip CP2 supplies data (R2_Data) stored in the buffer memory 113 to the bridge chip BC via the terminal group TM1 and the channel CH2 in response to the data output command CM12. The peripheral circuit 112 generates the data strobe signal DQS/DQS⁻ from the input read enable signal RE⁻/RE and supplies the data strobe signal DQS/DQS⁻ to the bridge chip BC via the terminal group TM3 and the channel CH2. At this time, the data signal DQ and the data strobe signal DQS are synchronized.

In response to this, the controller 103 of the bridge chip BC temporarily stores the data (R2_Data) received from the chip CP2 in the buffer memory 102 as indicated by the dotted line in FIG. 5B.

At timing t12 illustrated in FIGS. 3A to 3C, when receiving the read enable signal RE⁻/RE from the host HA, the controller 103 of the bridge chip BC generates the data strobe signal DQS/DQS⁻ in response to the read enable signal RE⁻/RE and starts transmitting the data strobe signal DQS/DQS⁻ to the host HA via the wired communication path CH. At the same time, the controller 103 reads data (R1_Data) stored in the buffer memory 101 and starts transmitting the data (R1_Data) to the host HA via the wired communication path CH0. At this time, the data R1_Data is transmitted to the host HA at a faster data transfer rate than the data transfer via the channels CH1 and CH2 as indicated by the thick dotted arrow in FIG. 5B.

It should be noted that the period between timings t8 and t13 when data is transferred from the chip CP1 to the bridge chip BC via the channel CH1 (chip-to-chip data transfer period) and the period between timings t12 and t14 when data is transferred from the bridge chip BC to the host HA via the wired communication path CH (chip-to-host data transfer period) have an overlapping period (timings between t12 and t13). If the overlapping period between the chip-to-chip data transfer period and the chip-to-host data transfer period is too long, the buffer memory 101 becomes empty in the middle of the chip-to-host data transfer period, and a standby state (underflow state) occurs until additional data through chip-to-chip data transfer is stored in the buffer memory 101, so that the data transfer efficiency decreases. Therefore, timing t12 can be determined in consideration of suppressing the length of the overlapping period to such an extent that the underflow state does not occur.

At timing t13 illustrated in FIGS. 3A to 3C, the controller 103 recognizes that the data transfer from the buffer memory 113 of the chip CP1 has been completed, and completes the storage of the data from the chip CP1 in the buffer memory 101. Further, the peripheral circuit 112 of the chip CP1 keeps the ready busy signal R/B⁻ at the H level (ready) and supplies the ready busy signal R/B⁻ to the bridge chip BC via the terminal TM4 and the channel CH1.

At this time, the controller 103 continues the operation of transferring the data (R1_Data) from the buffer memory 101 to the host HA via the wired communication path CH0.

At timing t14 illustrated in FIGS. 3A to 3C, the host HA monitors the amount of data transferred from the buffer memory 101 to the host HA, and recognizes that the data transfer from the buffer memory 101 to the host HA has been completed. At this time, the host HA recognizes that there is the next data transfer, and continues transmitting the read enable signal RE⁻/RE to the semiconductor device 1 (bridge chip BC). The controller 103 of the bridge chip BC continues receiving the read enable signal RE⁻/RE from the host HA, and continues generating the data strobe signal DQS/DQS⁻ in response to the read enable signal RE⁻/RE and transmitting the data strobe signal DQS/DQS⁻ to the host HA via the wired communication path CH.

At timing t15, the controller 103 reads the data (R2_Data) stored in the buffer memory 102 and starts transmitting the data (R2_Data) to the host HA via the wired communication path CH0 in response to the completion of data transfer from the buffer memory 101 to the host HA. At this time, the data R2_Data is transmitted to the host HA at a faster data transfer rate than the data transfer via the channels CH1 and CH2 as indicated by the thick dotted arrow in FIG. 5C.

It should be noted that the period between timings t11 and t16 when data is transferred from the chip CP2 to the bridge chip BC via the channel CH2 (chip-to-chip data transfer period) and a period between timings t15 and t17 when data is transferred from the bridge chip BC to the host HA via the wired communication path CH0 (chip-to-host data transfer period) have an overlapping period (timings between t15 and t16). If the overlapping period between the chip-to-chip data transfer period and the chip-to-host data transfer period is too long, the buffer memory 101 becomes empty in the middle of the chip-to-host data transfer period, and a standby state (underflow state) occurs until additional data through chip-to-chip data transfer is stored in the buffer memory 102, so that the data transfer efficiency decreases. Therefore, timing t15 can be determined in consideration of suppressing the length of the overlapping period to such an extent that the underflow state does not occur.

At timing t16 illustrated in FIGS. 3A to 3C, the controller 103 recognizes that the data transfer from the buffer memory 113 of the chip CP2 has been completed, and completes the storage of the data from the chip CP2 in the buffer memory 101. Further, the peripheral circuit 112 of the chip CP2 keeps the ready busy signal R/B⁻ from the L level (busy) to the H level (ready) and supplies the ready busy signal R/B⁻ to the bridge chip BC via the terminal TM4 and the channel CH2.

At this time, the controller 103 continues the operation of transferring the data (R2_Data) from the buffer memory 102 to the host HA via the wired communication path CH0.

At timing t17 illustrated in FIGS. 3A to 3C, the host HA monitors the amount of data transferred from the buffer memory 102 to the host HA, and recognizes that the data transfer from the buffer memory 102 to the host HA has been completed. At this time, the host HA determines that there is no next data transfer, and stops the toggle of the read enable signal RE⁻/RE. The controller 103 of the bridge chip BC stops toggling the data strobe signal DQS/DQS⁻ in response to the stop of toggle of the read enable signal RE⁻/RE.

As described above, in the semiconductor device 1 according to the present embodiment, the plurality of buffer memories 101 and 102 corresponding to the plurality of channels CH1 and CH2 are provided in the bridge chip BC with the capacity equal to or larger than the capacity of the buffer memory 113 for input/output of each of the chips. As a result, the data transfer rate between the host HA and the plurality of chips CP1 and CP2 via the bridge chip BC can be improved. Therefore, it is possible to efficiently use the wired communication path CH and the channels CH1 and CH2 as the toggle DDR interfaces without complicating the control of the host HA and without being regulated by the data transfer rate on the side of the chip CP1 and CP2.

(Modification)

The toggle DDR standard defines a function called read hold that stops read access to a chip once and transfers another command. In the read hold, it is required to return read data to the host HA from the continuation of data in the middle of being read when the read access is resumed. However, an allowable time for resuming a transfer operation in the read hold is short, and there is no enough time with resuming advance preparation in normal transfer.

Figure 6:
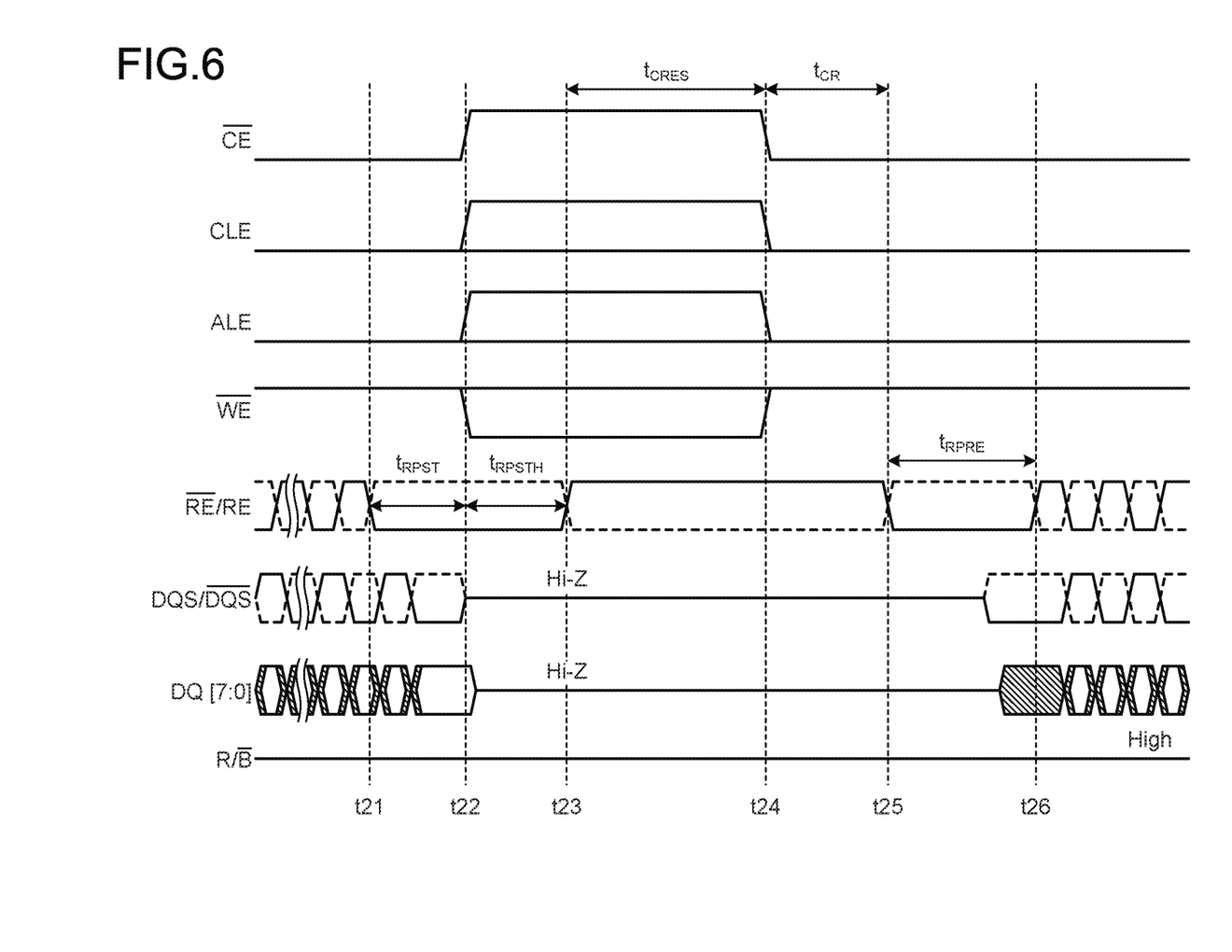
FIG. 6 is a waveform diagram illustrating operations of a semiconductor device according to a modification of the embodiment.

For example, FIG. 6 illustrates a case where read hold is performed in the bridge chip BC in response to a write command from the host HA in the middle of transferring read data from the buffer memory 102 to the host HA while temporarily storing the read data from the chip CP2 in the buffer memory 102. FIG. 6 is a waveform diagram in CH1 or CH2 illustrating operations of the semiconductor device 1 according to a modification of the embodiment. In FIG. 6, a chip enable signal CE is a signal for enabling a chip at an active level (L level). A command latch enable signal CLE is a signal for notifying that the DQ is a command at an active level (H level). An address latch enable signal CLE is a signal for notifying that DQ is an address at the active level (H level). WE is a signal for enabling write access at the active level (L level).

The host HA stops toggling the read enable signal RE⁻/RE at timing t21 in response to receipt of a predetermined request from the outside (for example, a higher-level controller) in the middle of transferring the data signal DQ from the semiconductor device 1. At this time, the transfer of read data from the semiconductor device 1 to the host HA in response to a host read command previously transmitted from the host HA to the semiconductor device 1 is interrupted in the middle.

At timing t22 when a period $t_{RPST}$ has elapsed from timing t21, the controller 103 stops outputting the data strobe signal DQS/DQS⁻ and the data DQ in response to the chip enable signal CE⁻ being deserted to a non-active level.

At timing t23 when $t_{RPSTH}$ has elapsed from timing t22, the host HA sets the read enable signal RE⁻/RE to the non-active level and starts processing in response to the predetermined request. For example, the host HA issues an access command, which requests an access operation to a chip different from the chip to which the read access has been performed with the host read command in the semiconductor device 1, and transmits the access command to the semiconductor device 1, and the semiconductor device 1 receives the access command and starts the access operation for the other chip.

At timing t24, the host HA asserts the chip enable signal CE⁻ to the active level when the processing according to the predetermined request ends.

At timing t25, the host HA asserts the read enable signal RE⁻/RE to the active level (here, RE⁻=L level, RE=H level) in response to the asserted chip enable signal CE.

At timing t26 when a period $t_{RPRE}$ has elapsed from timing t25, the host HA restarts toggling the read enable signal RE⁻/RE. The controller 103 of the bridge chip BC resume outputting the data strobe signal DQS/DQS⁻ and the data DQ in response to the resumption of toggle of the read enable signal RE⁻/RE.

In FIG. 6, the period $t_{RPST}$ is a transfer end processing period for entering the read hold, and a period $t_{RPSTH}$+$t_{CRES}$+$t_{CR}$ is a read hold period, and the period $t_{RPRE}$ is a transfer processing waiting period for returning from the read hold to the read access. This period $t_{RPRE}$ is, for example, about 10 ns, which is extremely short.

Figure 7:
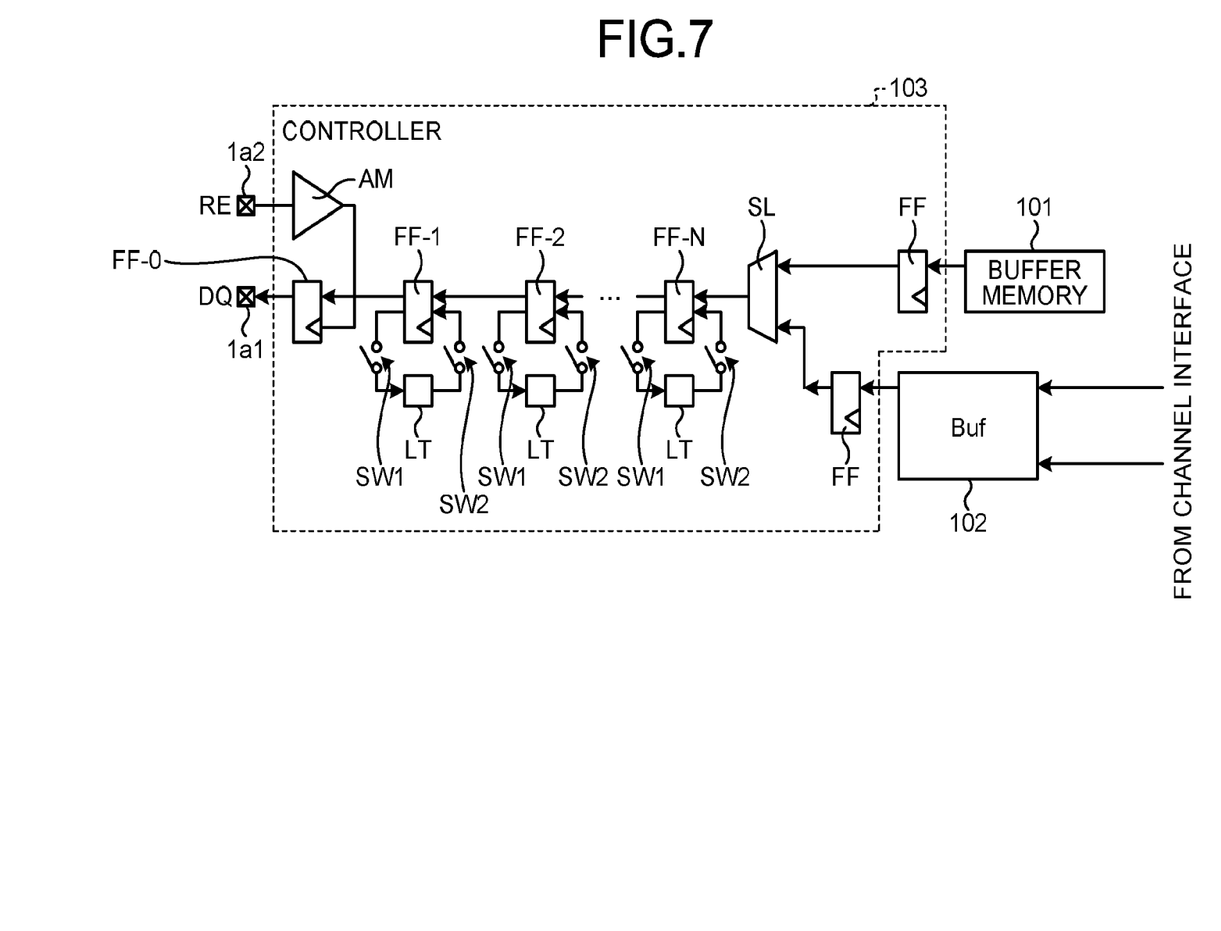
FIG. 7 is a diagram illustrating a part of a configuration of a controller according to the modification of the embodiment.

Meanwhile, If the transfer speed increases, it is necessary to use a frequency-divided clock for internal processing. Therefore, as illustrated in FIG. 7, (N+1) (N is an integer of two or more) flip-flops FF-0 to FF-N, a selector SL, and a flip-flop FF for timing convergence and frequency conversion of clock are placed in the data transfer path from the buffer memories 101 and 102 in the controller 103 to the terminal 1a1 for DQ. FIG. 7 is a diagram illustrating a part of a configuration of the controller 103 according to the modification of the embodiment. With this configuration, the latency of data transfer in the data transfer path tends to increase (a command response time when viewed from the host HA tends to increase). This latency period can hide a data preparation period on the chip CP2 side when read data is first output in response to a data output command.

However, it is required to perform the restart operation after performing the read hold in a short time (that is, the period $t_{RPRE}$) according to the standard. As illustrated in FIG. 7, if the read from the buffer memories 101 and 102 is stopped once, and then, another operation (for example, write access) is performed, the read data of the data transfer path is lost by being overwritten with the write data or the like. Therefore, re-setup is required at the time of resuming from the read hold, but reading data from the buffer memory 102 again takes time longer than the period $t_{RPRE}$, and there is a possibility that no enough time is given.

This modification uses a state retention flip-flop to the data transfer path. It makes enable to re-setup the controller 103 from read hold state quickly.

Specifically, according to this configuration, the read enable signal RE⁻/RE is kept at a fixed level in both the transfer end processing period $t_{RPST}$ at the start of read hold and the transfer processing waiting period $t_{RPRE}$ at the time of return as illustrated in FIG. 6. The read enable signal RE⁻/RE is a signal supplied to clock terminals of the flip-flops FF-0 to FF-N, and the flip-flops FF-0 to FF-N can hold data stably if the read enable signal RE⁻/RE is kept at a fixed level.

In order to configure each of the flip-flops FF as the retention flip-flop, a switch SW1 for save, a latch circuit LT, and a switch SW2 for restore are arranged in each of the N flip-flops FF-1 to FF-N as illustrated in FIG. 7. The switch SW1 has one end connected to a data output terminal of the flip-flop FF, and the other end connected to an input node of the latch circuit LT. The switch SW2 has one end connected to an output node of the latch circuit, and the other end connected to a data input terminal of the flip-flop FF.

Figure 8A:
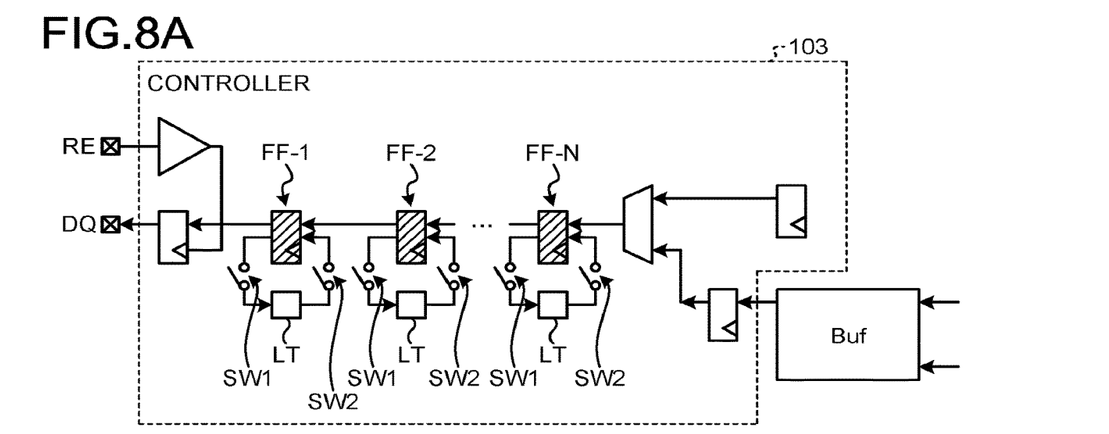
FIGS. 8A to 8C are diagrams illustrating operations of the controller according to the modification of the embodiment.
Figure 8B:
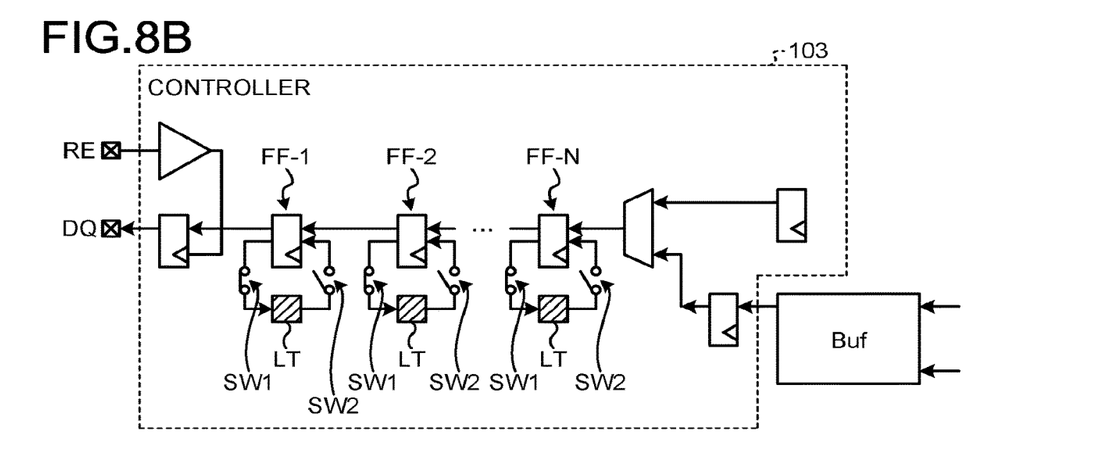
Figure 8C:
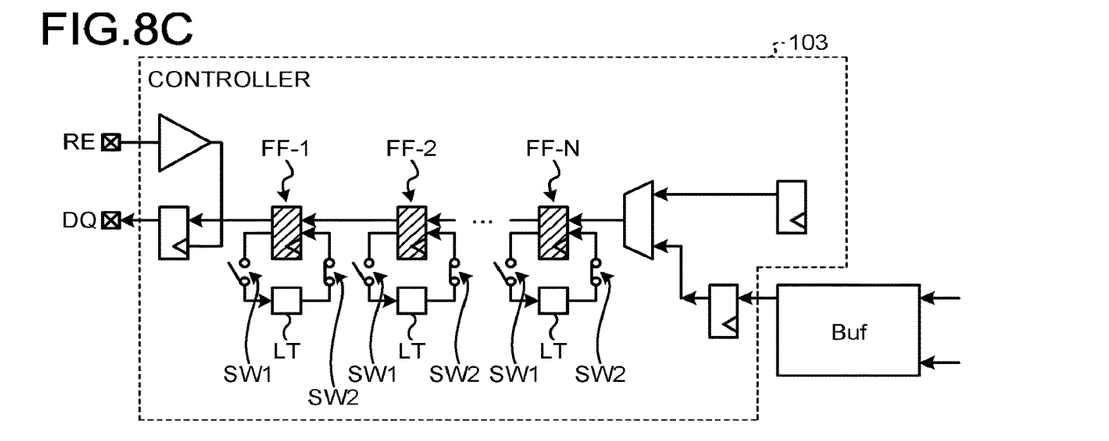

For example, at timing t21 illustrated in FIG. 6, it is assumed that each of the N flip-flops FF-1 to FF-N in the controller 103 holds read data as indicated by shaded hatching in FIG. 8A. FIGS. 8A to 8C are diagrams illustrating operations of the controller 103 according to the modification of the embodiment.

In the transfer end processing period $t_{RPST}$ at the start of read hold illustrated in FIG. 6, the controller 103 keeps the switches SW1 respectively connected to the N flip-flops FF-1 to FF-N in an on-state, and latches read data held in the flip-flop FF in the latch circuit LT to save the read data as indicated by the shaded hatching in FIG. 8B. At this time, the switches SW2 respectively connected to the flip-flops FF-1 to FF-N is kept in an off-state.

At a start timing t22 of the read hold period, all the switches SW1 and the switches SW2 connected to the respective flip-flops FF-1 to FF-N are kept in the off-state as illustrated in FIG. 8A.

In the transfer processing waiting period $t_{RPRE}$ when returning from the read hold illustrated in FIG. 6, the controller 103 keeps the switches SW2 respectively connected to the N flip-flops FF-1 to FF-N in the on-state, and returns the read data saved in the latch circuit LT to the flip-flop FF to restore the read data as indicated by the shaded hatching in FIG. 8C. At this time, the switches SW1 respectively connected to the flip-flops FF-1 to FF-N is kept in an off-state.

At a start timing t26 of read access, all the switches SW1 and the switches SW2 connected to the respective flip-flops FF-1 to FF-N are kept in the off-state as illustrated in FIG. 8A.

In this manner, each of the flip-flops FF-1 to FF-N in the data transfer path is configured as the retention flip-flop in this modification. As a result, the re-setup of the read data can be quickly performed when returning from the read hold.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor device comprising:
   a first chip electrically connected to a terminal to which a signal from a host is input;
   a second chip to which the first chip is electrically connected; and
   a third chip to which the first chip is electrically connected in parallel with the second chip,
   wherein the first chip includes:
   a first buffer memory corresponding to the second chip; and
   a second buffer memory corresponding to the third chip,
   the second chip includes a third buffer memory,
   the third chip includes a fourth buffer memory,
   a capacity of the first buffer memory is equal to or larger than a capacity of the third buffer memory, and
   a capacity of the second buffer memory is equal to or larger than a capacity of the fourth buffer memory,
   wherein each of the second chip and the third chip is a memory chip, and
   the first chip is configured to:
   receive a first request from the host,
   issue a first command to the second chip based on the received first request,
   receive a second request from the host after receiving the first request, and
   issue a second command to the third chip based on the received second request after issuing the first command,
   the second chip is configured to:
   read first data based on the first command; and
   transmit the read first data to the first chip,
   the third chip is configured to:
   read second data based on the second command; and
   transmit the read second data to the first chip, and
   wherein
   the first chip is configured to
   perform, in parallel with a first operation of storing the first data received from the second chip into the first buffer memory, a second operation of transmitting the first data from the first buffer memory to the host.

2. The semiconductor device according to claim 1, wherein
   the capacity of the first buffer memory is an integral multiple of a data size which is a unit of reading data in the second chip, and the capacity of the second buffer memory is an integral multiple of a data size which is a unit of reading data in the third chip.

3. The semiconductor device according to claim 2, wherein
the capacity of the third buffer memory is the data size which is the unit of reading data in the second chip, and
the capacity of the fourth buffer memory is the data size which is the unit of reading data in the third chip.

4. The semiconductor device according to claim 1, wherein
the first chip is configured to perform, in parallel with the first operation of storing the first data received from the second chip into the first buffer memory, a third operation of transmitting and receiving a signal relating to the second chip to and from the host.

5. The semiconductor device according to claim wherein
the first chip is configured to perform, in parallel with the first operation of storing the first data received from the second chip into the first buffer memory, a third operation of transmitting and receiving a signal to and from the second chip.

6. The semiconductor device according to claim 1, wherein
the first chip is configured to perform, in parallel with the first operation of storing the first data received from the second chip into the first buffer memory, a third operation of transmitting and receiving a signal relating to the third chip to and from the host.

7. The semiconductor device according to claim 1, wherein
the first chip is configured to perform, in parallel with the first operation of storing the first data received from the second chip into the first buffer memory, a third operation of transmitting and receiving a signal to and from the third chip.

8. The semiconductor device according to claim 1, wherein
the first chip is configured to supply a first signal to the second chip based on the issuance of the first command, and
the second chip is configured to read the first data based on the first command and the first signal and transmit the read first data to the first chip.

9. The semiconductor device according to claim 8, wherein
the first chip includes:
a data terminal; and
a plurality of flip-flops electrically connected between the first buffer memory and the data terminal, and
the first chip is configured to save data of the plurality of flip-flops during a first period in which the first signal is deactivated, and restore the saved data during a second period in which the first signal is activated.

10. The semiconductor device according to claim 9, wherein
the first chip further includes:
a plurality of latch circuits;
a plurality of first switches each of which configured to connect an output terminal of any one flip-flop of the flip-flops and an input node of any one latch circuit of the latch circuits; and
a plurality of second switches each of which configured to connect an output node of the one latch circuit and an input terminal of the one flip-flop, and
the first chip is configured to keep the first switches in an on-state and keep the second switches in an off-state during the first period, keep the first switches in the off-state and keep the second switches in the off-state during a third period between the first period and the second period, and keep the first switches in the off-state and keep the second switches in the on-state during the second period.

11. The semiconductor device according to claim 8, wherein
the first chip is configured to deactivate the first signal in response to a predetermined request received from the host during a first period, and activate the first signal in response to completion of processing for the predetermined request during a second period.

12. The semiconductor device according to claim 11, wherein
the first chip includes:
a data terminal; and
a plurality of flip-flops electrically connected between the first buffer memory and the data terminal, and
the first chip is configured to save data of the plurality of flip-flops during the first period, and restore the saved data during the second period.

13. The semiconductor device according to claim 12, wherein
the first chip further includes:
a plurality of latch circuits;
a plurality of first switches each of which configured to connect an output terminal of any one flip-flop of the flip-flops and an input node of any one latch circuit of the latch circuits; and
a plurality of second switches each of which configured to connect an output node of the one latch circuit and an input terminal of the one flip-flop, and
the first chip is configured to keep the first switches in an on-state and keep the second switches in an off-state during the first period, keep the first switches in the off-state and keep the second switches in the off-state during a third period between the first period and the second period, and keep the first switches in the off-state and keep the second switches in the on-state during the second period.

14. The semiconductor device according to claim 1, further comprising:
a plurality of the second chips that are stacked with each other; and
a plurality of the third chips that are stacked with each other.

15. The semiconductor device according to claim 14, further comprising:
a first channel that electrically connects the first chip and the plurality of the second chips; and
a second channel that electrically connects the first chip and the plurality of the third chips.

16. The semiconductor device according to claim 15, wherein
the first chip is configured to control the first channel independently of the host in response to a request for the second chip received from the host, and
the first chip is configured to control the second channel independently of the host in response to a request for the third chip received from the host.

17. The semiconductor device according to claim 16, wherein
the request for the second chip is a data output request with respect to the second chip, and
the request for the third chip is a data output request with respect to the third chip.

18. The semiconductor device according to claim 1, wherein
   each of the second chip and the third chip is a NAND-type flash memory chip.

19. The semiconductor device according to claim 1, wherein
   the first chip has a data transfer rate with respect to the host faster than a data transfer rate with respect to the second chip, the data transfer rate with respect to the host being faster than a data transfer rate with respect to the third chip.

\* \* \* \* \*